US006823459B1

United States Patent
Horikoshi et al.

(10) Patent No.: US 6,823,459 B1
(45) Date of Patent: *Nov. 23, 2004

(54) METHOD FOR PROHIBITING UNAUTHORIZED ACCESS IN A NON-CONTACTING DATA CARRIER SYSTEM

(75) Inventors: Hideto Horikoshi, Sagamihara (JP); Naoki Abe, Yamato (JP); Jun Tanaka, Zama (JP); Tomoki Maruichi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,573

(22) Filed: Feb. 22, 2000

(30) Foreign Application Priority Data

Mar. 4, 1999 (JP) ............................. 11-056963

(51) Int. Cl.$^7$ ............................. G06F 11/30; G06F 1/26
(52) U.S. Cl. ..................... 713/200; 713/300; 713/310
(58) Field of Search ................................ 713/200, 300, 713/310

(56) References Cited

U.S. PATENT DOCUMENTS 5,406,261 A * 4/1995 Glenn ........................ 340/571
5,712,973 A * 1/1998 Dayan et al. ............... 713/200
5,751,950 A * 5/1998 Crisan ........................ 713/202
5,862,803 A * 1/1999 Besson et al. ............... 600/508
5,970,227 A * 10/1999 Dayan et al. ............... 713/200
6,189,105 B1 * 2/2001 Lopes ........................ 713/202
6,286,106 B1 * 9/2001 Flannery .................... 713/310
6,300,946 B1 * 10/2001 Lincke et al. ............... 345/700
6,643,781 B1 * 11/2003 Merriam .................... 713/201

* cited by examiner

*Primary Examiner*—Gregory Morse
*Assistant Examiner*—Matthew Heneghan
(74) *Attorney, Agent, or Firm*—Carlos Munoz-Bustamante; Dillon & Yudell, LLP (57) ABSTRACT

To provide a method whereby unauthorized data access by an RFID data processing system is prohibited without any degradation of performance being incurred. An RFID data processing system 30 comprises a CPU 35, a EEPROM 34, communication devices 31 and 32, and power controllers 40 and 41. When an RFID data processing system 30 in the power-ON state that does not have access authorization passes through a portal gate located at the entrance to an unauthorized data access protection area, the portal gate transmits a signal to set ON a tamper bit 44 in the EEPROM 34. When the tamper bit 44 has been set ON, a tamper bit interrupt request signal is output by the EEPROM 34. Upon receiving this signal, the power controllers 40 and 41 power off the RFID data processing system 30.

23 Claims, 7 Drawing Sheets

ND FOR PROHIBITING
UNAUTHORIZED ACCESS IN A NON-
CONTACTING DATA CARRIER SYSTEM

CROSS REFERENCE TO RELATED APPLICATION

This application claims priority from Japanese Patent Application 11-056963, filed Mar. 4, 1999 (MM/DD/YY), which is commonly assigned with the present application and is hereby incorporated by reference. The contents of the present application are not necessarily identical to the contents of the priority document.

BACKGROUND OF THE INVENTION

1. Technical Field

The present invention relates generally to providing an improved system of security in data processing systems and in particular to a method for prohibiting unauthorized access to data processing systems using a non-contacting (hereafter "wireless") data carrier system. Still more particularly, the present invention relates to reducing the degradation in data processing system performance inherent in effectively denying access to an unauthorized user by means of a wireless data carrier system.

2. Description of the Related Art

The current state of the art includes an RFID (Radio Frequency Identification) technique that uses a radio frequency signal to exchange ID (Identification) data. When this RFID technique is used for a PDA (Personal Data Assistant), a notebook data processing system (PC), or other data processing system, unauthorized access to specific data processing systems can be prohibited.

Discussion of the current art logically begins with a system according to which the RFID technique is used for a data processing system, such as a PDA or a notebook PC. Such a PDA or notebook PC, for which the RFID technique is used, is called an "RFID data processing system."

An RFID data processing system includes an incorporated EEPROM (Electrically Erasable and Programmable Read Only Memory) storing a variety of data, including an ID, and using a radio frequency signal when transmitting data stored in the EEPROM to an external device. Upon receiving such a radio frequency signal, the external device, in turn, uses a radio frequency signal to respond to the data received from the RFID data processing system. For this, the external device determines, for example, whether the ID contained in the received data is available in its database. When the ID is available, the external device transmits a permission response to the RFID data processing system; while when the ID is not present, the external device transmits an inhibition response to the RFID data processing system.

Assuming that a LAN (Local Area Network) is constructed in a specific area, and that use of the LAN is limited to specific users while unauthorized users are denied access, an RFID data processing system such as a PDA or a notebook PC carried by a user can be conveniently used in such an area (hereinafter referred to as an "unauthorized data access protection area"). In this case, a function for the exchange of radio frequency signals with an RFID data processing system is provided at the entrance to the unauthorized data access protection area, and a function for processing the exchanged data can be provided for a data processing system that is connected to the LAN. The entrance to the unauthorized data access protection area is called a portal gate.

To enter the unauthorized data access protection area, a user must input a supervisor password (e.g., a privileged-access password, hereinafter referred to as a PAP) at his or her RFID data processing system before being permitted to pass the portal gate. Thereafter, the portal gate transmits a command for setting a tamper bit, provided in the EEPROM of the RFID data processing system, to "1". The tamper bit, a specific bit used to prohibit the unauthorized reading and writing of data in the EEPROM, is normally set to "0," and is set to "1" only when an RFID data processing system has been passed through the portal gate. When the tamper bit is set to "0.1," the EEPROM prohibits reading and writing of data, so that unauthorized access to the EEPROM can be prevented.

Figure 8:
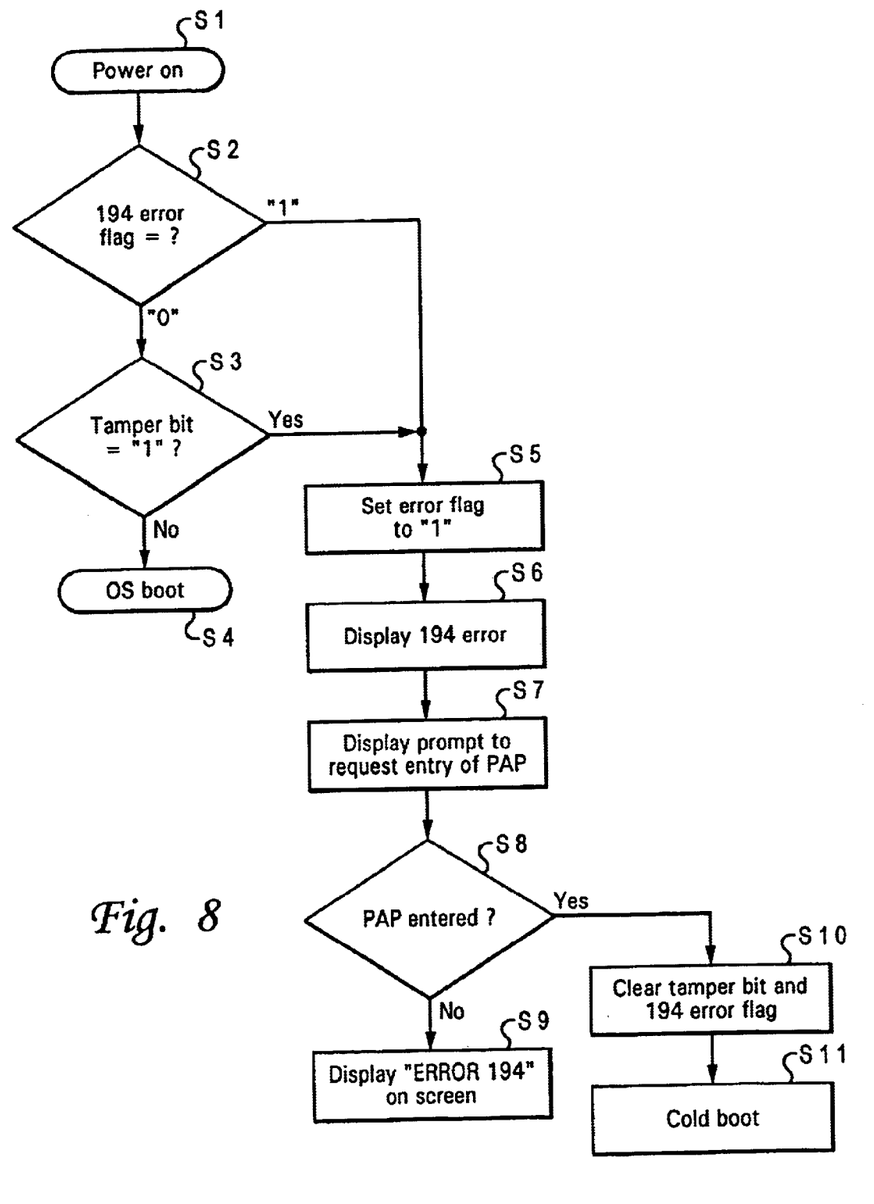
FIG. 8 is a flowchart showing the conventional processing performed when an RFID data processing system in the power-OFF state is powered on in an unauthorized data access protection area.

The flowchart in FIG. 8 explains the operation performed when an RFID data processing system located in the unauthorized data access protection area toggles from the power-OFF state to the power-on state. When the RFID data processing system is powered on (step S1), the POST (Power On Self Test) program examines the state of an 194 error flag, a portal gate passing error, in the EEPROM (step S2). If the 194 error flag is set to "0," program control advances to step S3, while when the flag is set to "1," program control goes to step S5. When the PAP has not entered, the 194 error flag is set to 111.11 At step S3, the POST determines whether the tamper bit in the EEPROM has been set to "1." When the tamper bit="0" (No), program control advances to step S4. When the tamper bit="1" (Yes), program control moves to step S5. At step S4, the OS boot is performed and the operating system is activated. Thereafter, the RFID data processing system can be used without any constraint. That is, the RFID data processing system can be connected to the LAN in the unauthorized data access protection area, and can legally access other data processing systems connected to the LAN. Since as is described above the OS is booted when the 194 error flag="0" and the tamper bit="0," no protective response occurs and the RFID data processing system is permitted to access the LAN freely. This occurs because the presence of the 194 error flag in the "0" state and the tamper bit in the "0" state imply that the PAP was entered while the RFID data processing system was on and the RFID data processing system was then passed through the portal gate (i.e., it obtained access authority).

At step S5, the POST sets the 194 error flag in the EEPROM to "1." Program control then moves to step S6, where the POST displays an "194 error" message, and program control advances to step S7. At step S7, the POST displays a prompt requesting the entry of the PAP. Program control thereafter advances to step S8. At step S8, the POST determines whether the PAP has been entered. If the decision is negative, program control goes to step S9. If the decision is positive, program control advances to step S10. At step S9, the POST continues to display the "194 error" ("ERROR 194") message, and operation of the RFID data processing system by the user is thereafter prohibited. At step S10, the POST clears the 194 error flag and the tamper bit in the EEPROM. Program control then advances to step S11, where a cold boot of the system is performed. During the cold boot, the POST is again executed from the beginning.

A conventional RFID data processing system has a problem in that, when an RFID data processing system is passed through the portal gate while it is in the power-ON state, the user can continue to use the RFID data processing system until he or she turns it off manually. As a result, while in the unauthorized data access protection area the user can connect his or her RFID data processing system to the LAN and can access files stored in other data processing systems connected to the LAN, even though he or she has not been granted this authority.

Figure 9:
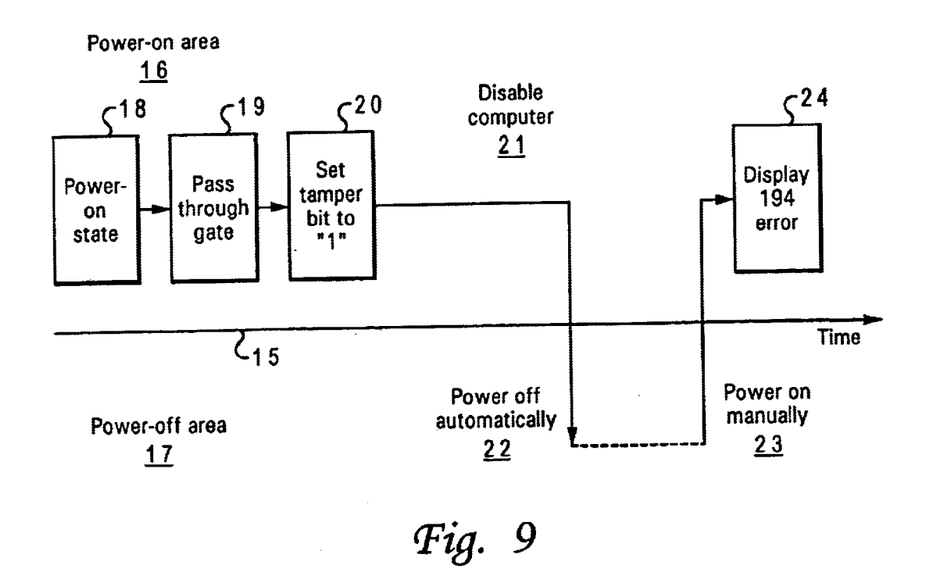
FIG. 9 is a diagram showing the state transition when an RFID data processing system is in the power-ON state before it enters or exits from an unauthorized data access protection area.

The above problem will be clarified by referring to FIG. 9, wherein is shown the state transition of an RFID data processing system. In FIG. 9, the area above the time axis 15 represents a power-ON area 16, while the area below the time axis 15 represents a power-OFF area 17. At the beginning, the RFID data processing system is in the power-ON state (state 18), and in this state is passed through the portal gate (state 19). At this time, the portal gate transmits a command to set to "1" the tamper bit in the EEPROM of the RFID data processing system, and upon receiving this command, the RFID data processing system sets the tamper bit in the EEPROM to "1" (state 20). Thereafter, however, the conventional RFID data processing system permits the user to continue to operate the RFID data processing system (state 21). Thus, while operating in the 1:0 unauthorized data access protection area, the user can connect the RFID data processing system to the LAN and, without having been granted the authority to do so, can access files stored on another data processing system connected to the LAN.

When the user manually powers off the RFID data processing system (state 22) and then powers it on again (state 23), an "194 error" message is displayed, as is described above. Thereafter, either a cold boot is performed or the "194 error" message is continuously displayed, depending on whether the PAP is entered. In this state, the above described unauthorized access is prohibited.

As is described above, an unauthorized RFID data processing system, which was passed through the portal gate while it was in the power-ON state, can not be detected by the conventional RFID data processing system. To resolve this problem, a method has been used calls for the installation in an OS of a polling program for determining whether the tamper bit is set to "1." However, since the polling method whereby a CPU (Central Processing Unit) periodically examines the state of the tamper bit, is performed regardless of the state of the tamper bit, extra CPU processing time is required. This creates a new problem, the deterioration of the performance of the RFID data processing system, is encountered when the polling method is used. The present invention is provided to resolve these problems.

SUMMARY OF THE INVENTION

It is therefore one object of the present invention to provide an improved system of security in data processing systems.

It is another object of the current invention to provide a method for prohibiting unauthorized access to data processing systems using a wireless data carrier system.

It is yet another object of the present invention to reduce the degradation in system performance inherent in effectively denying access to an unauthorized user by means of a wireless data carrier system.

To achieve the above objects, according to the present invention a wireless data carrier, used in a method that prohibits unauthorized accesses to a wireless data carrier system, comprises a CPU, a semiconductor memory, a communication device, and a power controller.

If a wireless data carrier in the power-ON state does not have access authority when it enters or exits from an unauthorized data access protection area, a signal for setting a predetermined bit in an incorporated semiconductor memory to "ON" is transmitted to the wireless data carrier. Additionally, an interrupt request, originating at the semiconductor memory in which the predetermined bit was set ON, is issued to the power controller. Upon receiving the interrupt request, the power controller powers off.

Another method may be used according to which the CPU receives the interrupt request originating at the semiconductor memory in which the predetermined bit was set to ON. The CPU then issues a request that data be entered to acquire access authority, and if no such entry is made, disables the RFID data processing system.

As is described above, according to the method for prohibiting unauthorized access using the wireless data carrier system of the present invention, an interrupt request originating at a semiconductor memory in which a predetermined bit is set is used to prohibit unauthorized access. Therefore, unlike the prior art, wherein polling is performed to determine whether a predetermined bit has been set, extra CPU processing time is not required. And as a result, unauthorized access can be prohibited without any deterioration in performance being incurred.

BRIEF DESCRIPTION OF THE DRAWINGS

The novel features believed characteristic of the invention are set forth in the appended claims. The invention itself however, as well as a preferred mode of use and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
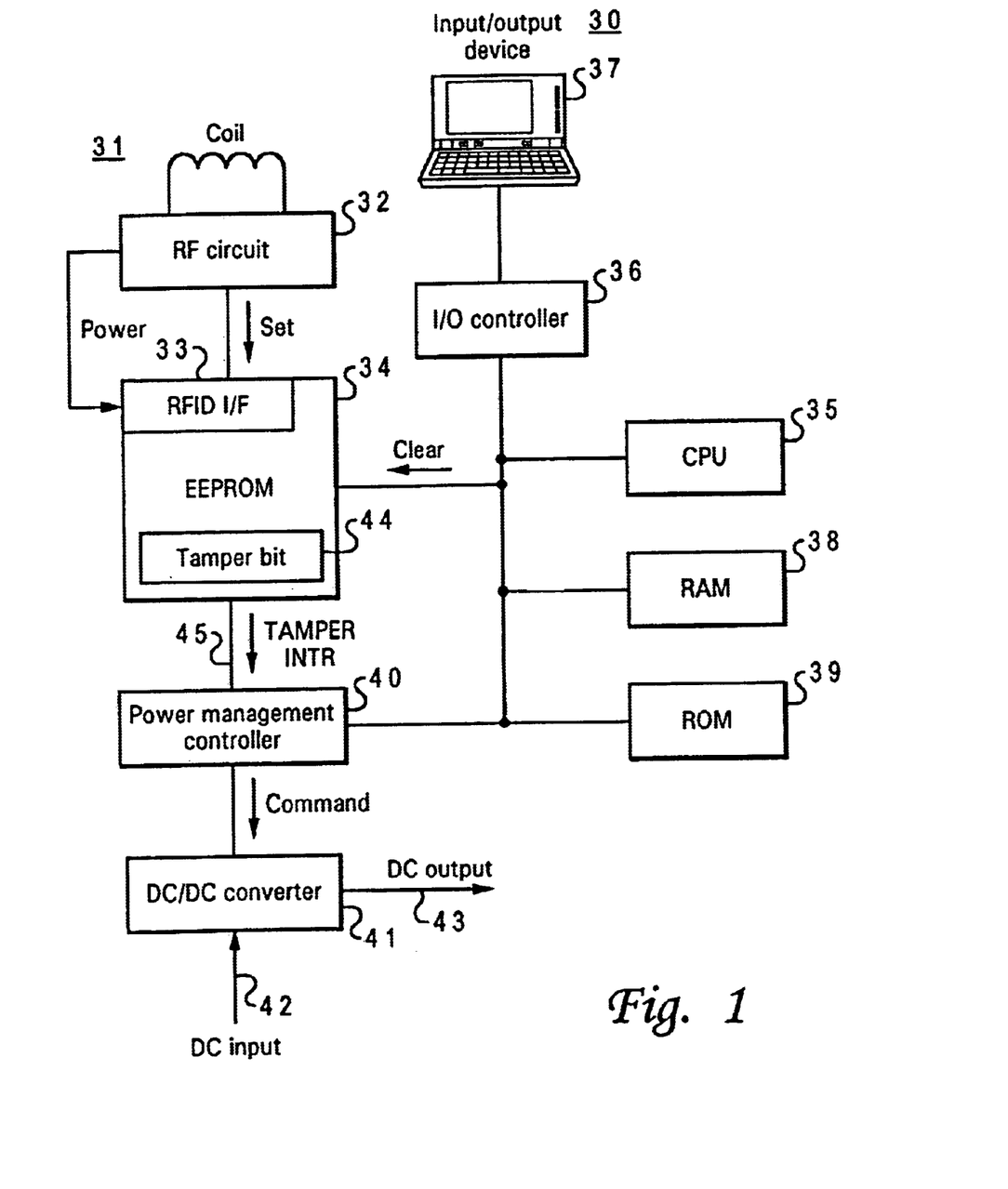
FIG. 1 is a diagram showing an RFID data processing system according to one embodiment of the present invention.

With reference now to the figures, and in particular with reference to FIG. 1, a diagram showing an example RFID data processing system used for the embodiment of the present invention, an RFID data processing system 30 in FIG. 1 is a notebook data processing system (PC), as is apparent from the shape of an input/output device 37. However, the RFID data processing system can be variously modified, and such a modification will be described in detail later.

The RFID data processing system 30 comprises: a CPU 35, for performing data processing and for controlling the individual sections; a ROM (Read Only Memory) 39, in which an operating system (OS) for operating the CPU 35 and an application program are stored; a RAM (Random Access Memory) 38, used as a work area for the CPU 35 for data processing; an EEPROM (Electrically Erasable and Programmable Read Only Memory) 34, in which information, such as an ID, is stored; an RF circuit 32, for exchanging radio frequency signals with a portal gate using a coil 31; an I/O (Input/Output) controller 36, for controlling the input/output device 37; a power management controller 40; and a DC/DC (Direct Current/Direct Current) converter 41. As the CPU 35, a micro-processor or a micro-controller by Intel Corp., for example, is used.

An embedded controller H8™ by Hitachi Ltd., for example, is used as the power management controller 40. Under the direction of the micro-controller 35, the power management controller 40 regulates the power consumed by the individual sections. The DC/DC converter 41 is supervised by the power management controller 40 and converts DC input 42 into DC output 43.

AT24RF08 by Atmel Corp., for example, is used as the EEPROM 34 and an RFID interface (I/F) 33 and a tamper bit 44 are also provided. The RFID I/F 33 receives power from the RF circuit 32, independent of the RFID data processing system 30. This power is induced by the coil 31. As a result, the portal gate that exchanges radio frequency signals can perform reading and writing of data in the EEPROM 34 in the wireless state. The tamper bit 44 is a specific bit provided to prohibit the unauthorized reading and writing of data in the EEPROM 34. The tamper bit 44 is normally set to "0," but when the RFID data processing system 30 has passed through the portal gate, it is set to "1." When the tamper bit 44 is set to "1," the EEPROM 34 prohibits reading and writing of data in the EEPROM 34, so that unauthorized access to the EEPROM 34 can be prohibited.

In this embodiment, when the tamper bit 44 has been set to "1," a "tamper bit interrupt" signal ("TAMPER INTR") 45 is output by the EEPROM 34. The "tamper bit interrupt" signal 45 is implemented in the following manner. The terminal name, "TAMPER INTR," is allocated to an empty terminal in the EEPROM 34 of an AT24RF08 by Atmel Corp. The TAMPER INTR terminal is connected via an output buffer to the tamper bit 44 internally provided for the EEPROM 34. Then, the tamper bit 44 in the EEPROM 34 can be externally output as the "TAMPER INTR" signal 45.

Figure 2A:
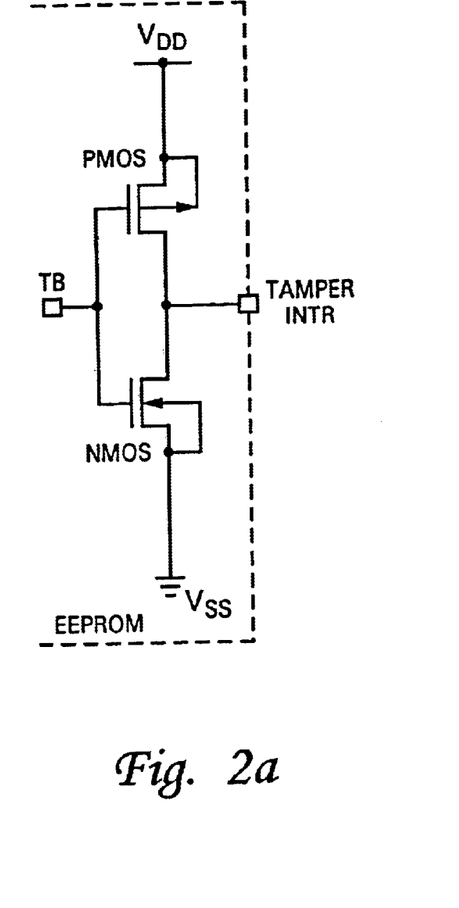
FIG. 2 is a diagram showing an output buffer positioned between a TAMPER INTR terminal and a tamper bit TB.
Figure 2B:
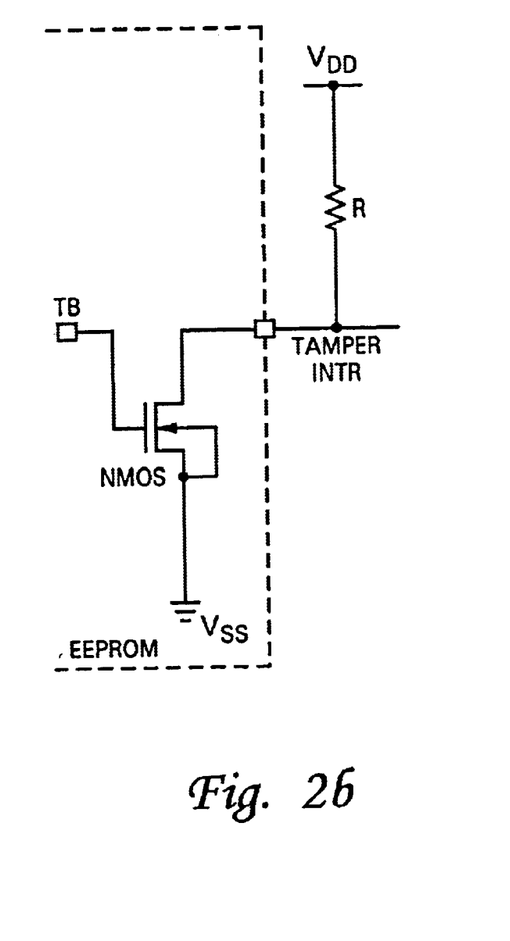

FIG. 2(a) is a diagram showing the output buffer positioned between the TAMPER INTR terminal and a tamper bit TB constituted by a CMOS inverter. The setting of the tamper bit TB is transmitted to the CMOS inverter, constituted by a PMOS transistor and an NMOS transistor, and a +TAMPER INTR signal is output to output terminal TAMPER INTR. FIG. 2(b) is a diagram showing the output buffer positioned between the TAMPER INTR terminal and a tamper bit TB constituted by an open drain circuit. The setting of the tamper bit TB is transmitted to the open drain NMOS transistor, and a −TAMPER INTR signal is output at the output terminal TAMPER INTR to which a pull up resistor R is connected. This circuit is used to wired-OR the −TAMPER INTR signal outside the EEPROM.

An explanation will now be given for the operation in this embodiment of the RFID data processing system 30 in FIG. 1. First, a LAN is constituted, the use of which is limited to specific users in order to prohibit unauthorized access by users who have not been granted access authority. The area in which the LAN is built is called an unauthorized data access protection area. A portal gate is provided at the entrance to this area (the "portal gate" is also called a "gate with a portal reader"). Equipment employed for exchanging radio frequency signals with the RFID data processing system 30 is provided for the portal gate. The function for processing data to be exchanged can be provided for a data processing system connected to the LAN.

An explanation will now be given, while referring to the flowchart in FIG. 3, for the operation performed when the RFID data processing system 30 in the power-OFF state or in the hibernation state is carried into the unauthorized data access protection area. The RFID data processing system 30 passes through the portal gate (step S51) and enters the unauthorized data access protection area. At this time, the EEPROM 34 sets the tamper bit 44 to "1" (step S52). When the RFID data processing system 30 is powered on in the unauthorized data access protection area (step S53), the POST (Power On Self Test) program detects that the tamper bit 44 is set to "1," and sets the 194 error flag to "1" (step S54). Program control then advances to step S55, where the POST assumes control of the I/O controller 36 and displays an "194 error" message on the screen of the input/output device 37. Thereafter, program control moves to step S56.

At step S56, the POST assumes control of the I/O controller 36 and displays a prompt requesting the entry of a PAP (Privileged-Access Password) on the screen of the input/output device 37. Then, program control moves to step S57. The PAP is a supervisor password, and while a POP (Power On Password) can be used instead of the PAP, hereinafter the PAP is used. At step S57, the POST determines whether the PAP has been entered. If the decision returns a negative result, program control advances to step S58, while if the decision returns a positive response, program control goes to step S59. At step S58, the POST assumes control of the I/O controller and continues to display the "194 error" ("ERROR 194") message on the screen of the input/output device 37. Thereafter, the user can not use the RFID data processing system 30. At step S59, the POST clears the tamper bit 44 and the 194 error flag. Following this, program control advances to step S60 and a cold boot of the system is performed. A cold boot is performed so that the POST will be executed again from the beginning. Upon the performance of the cold boot, the system is reactivated.

Figure 4:
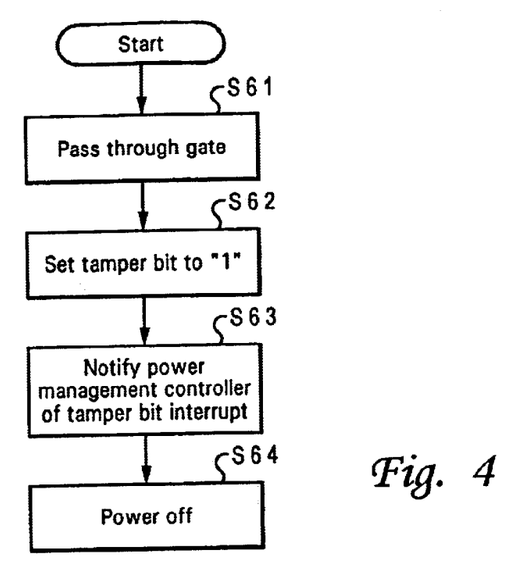
FIG. 4 is a flowchart showing the processing performed when an RFID data processing system is in the power-ON state, the standby state or the suspend state before it enters or exits from an unauthorized data access protection area.

Referring to the flowchart in FIG. 4 for the operation performed when the RFID data processing system 30 is in the power-ON state, in the standby state, or in the suspend state before it enters the unauthorized data access protection area, the I/O controller 36, which controls the input/output device 37, is controlled by the POST when the RFID data processing system 30 is in the power-ON state or in the standby state, and is controlled by the power management mechanism when the RFID data processing system 30 is in the suspend state. The power management mechanism can be provided, for example, by an APM (Advanced Power Management) BIOS or an ACPI (Advanced Configuration and Power Interface) BIOS. The APM specifications are determined by Intel Corp. and Microsoft Corp., and provide an interface between a BIOS and an application program in order to control the power available for a personal data processing system. The ACPI specifications are determined by Microsoft Corp., Intel Corp., and Toshiba Co., Ltd., for the use of an OS to manage power and configuration. The BIOS (Basic Input/Output System) is a control program module group that depends on the hardware in the OS to control the hardware.

When the portal gate is passed by the RFID data processing system 30 (step S61), the tamper bit 44 provided in the EEPROM 34 is set to "1" (step S62) for the following reasons. The portal gate transmits a command to set to "1" the tamper bit 44 in the EEPROM 34 that is incorporated in the RFID data processing system 30. The RF circuit 32 receives this command via the coil 31, and transmits it to the RF I/F 33 in the EEPROM 34. The EEPROM 34 interprets the received command, and sets the tamper bit 44 to "1." This command is, for example, a "Set EEPROM Tamper Latch" command or a "Global Set Tamper Latch" command. Program control then moves to step S63, where the "TAMPER INTR" signal 45 is output to the power management controller 40 by the EEPROM 34 in which the tamper bit 44 was set to "1." After this, program control advances to step S64.

At step S64, upon receiving the "TAMPER INTR" signal 45, the power management controller 40 executes an interrupt routine, and instructs the DC/DC converter 41 to power off the RFID data processing system 30. Upon receiving this instruction, the DC/DC converter 41 halts the DC output 43. As a result, the RFID data processing system 30 is powered off, and to the user it appears that the RFID data processing system 30 was powered off automatically. Thereafter, the RFID data processing system 30 can not be used in the unauthorized data access protection area. Thus, data processing systems connected to the LAN in this area are protected from unauthorized access.

Figure 5:
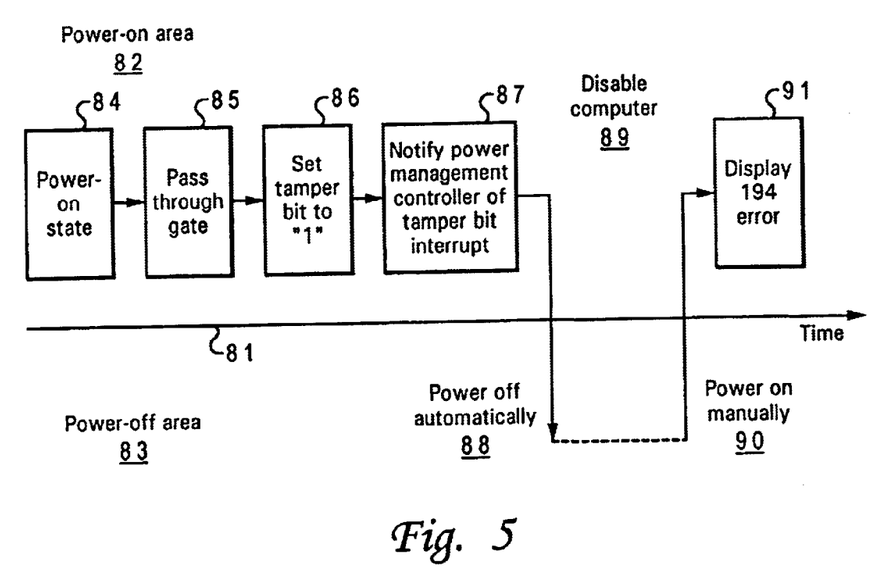
FIG. 5 is a diagram showing the state transition when an RFID data processing system is in the power-ON state, the standby state or the suspend state before it enters or exits from an unauthorized data access protection area.

The above operation will be explained by using a visual aid reflecting another viewpoint, while referring to FIG. 5, in which the state transition of the RFID data processing system 30 is shown. In FIG. 5, the area above a time axis 81 represents a power-ON area 82, and the area below the time axis 81 represents a power-OFF area 83. At the beginning, the RFID data processing system 30 is in the power-ON state. The RFID data processing system 30, while in the power-ON state (state 84), passes through the portal gate (state 85). At this time, the portal gate transmits a command to set to "1" the tamper bit 44 in the EEPROM 34 that is incorporated in the RFID data processing system 30. Upon receiving this command, the RFID data processing system 30 sets to "1" the tamper bit 44 in the EEPROM 34 (state 86).

When the tamper bit 44 has been set to "1," the "TAMPER INTR" signal 45 is output to the power management controller 40 by the EEPROM 34 (state 87). Upon receiving the "TAMPER INTR" signal 45, the power management controller 40 executes the interrupt process routine and instructs the DC/DC converter 41 to power off the RFID data processing system 30. Upon receiving this instruction, the DC/DC converter 41 halts the DC output 43. As a result, the RFID data processing system 30 is powered off, and to the user it appears that the RFID data processing system 30 was powered off automatically (state 88). Thereafter, the RFID data processing system 30 can not be used in the unauthorized data access protection area. Thus, data processing systems connected to the LAN in this area can be protected from unauthorized access.

Figure 3:
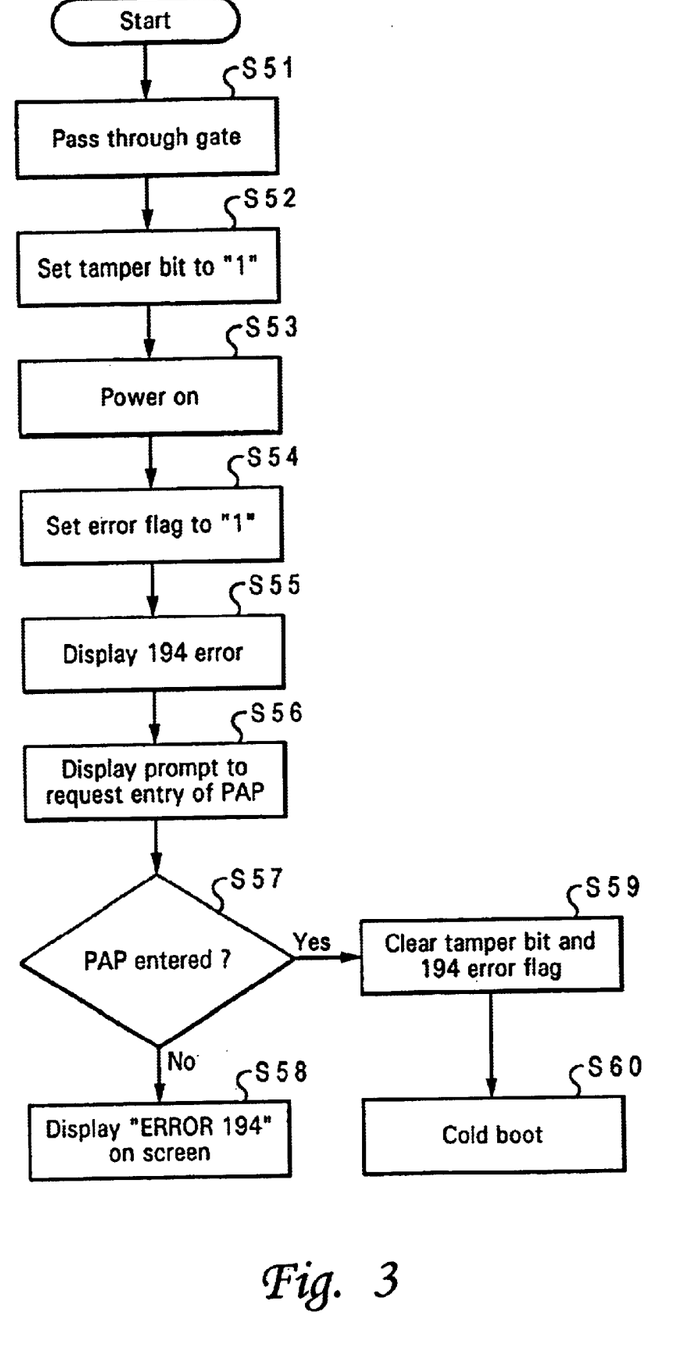
FIG. 3 is a flowchart showing the processing performed when an RFID data processing system is in the power-OFF state or the hibernation state enters an unauthorized data access protection area.

When the user manually powers on the RFID data processing system 30 (state 90), the "194 error" message is displayed, as in the flowchart in FIG. 3. Then, either a cold boot is performed or the "194 error" message is displayed continuously, depending on whether the PAP has been input. If the display of the "194 error" message is continued, the pertinent RFID data processing system 30 can not be activated.

As is described above, according to this embodiment, when an RFID data processing system in the power-ON state or in the standby state is passed through the portal gate without a predetermined password (e.g., a PAP or a supervisor password) being entered, the pertinent RFID data processing system is automatically powered off. As a result, data processing systems connected to the LAN in the unauthorized data access protection area are protected from unauthorized access. In addition, since the powering off is performed by interrupt of a tamper bit, the minimum CPU processing time is required. That is, while a very long CPU processing time is conventionally required because the tamper bit is polled, in this embodiment the minimum CPU processing time is required. Thus, secrets in the unauthorized data access protection area can be protected without incurring any deterioration in system performance.

An explanation has been given for the method whereby an RFID data processing system 30 is automatically powered off when it is passed through a portal gate while in the power-ON state. Such an explanation will now be given, while referring to the flowchart in FIG. 6, for a method whereby instead of powering off an RFID data processing system, a prompt is displayed requesting the entry of a PAP. When the RFID data processing system 30 is passed through the portal gate (step S71), the tamper bit 44 in the EEPROM 34 is set to "1" (step S72). This is the same process as is performed at step S52 in the flowchart in FIG. 3. At step S73, the "TAMPER INTR" signal 45 is output to the power controller 40 by the EEPROM 34 in which the tamper bit 44 has been set to "1." At step S74, data entry at the input/output device 37, such as at a keyboard or a mouse, is halted temporarily, and at step S75 a prompt is displayed requesting the entry of a PAP.

Figure 6:
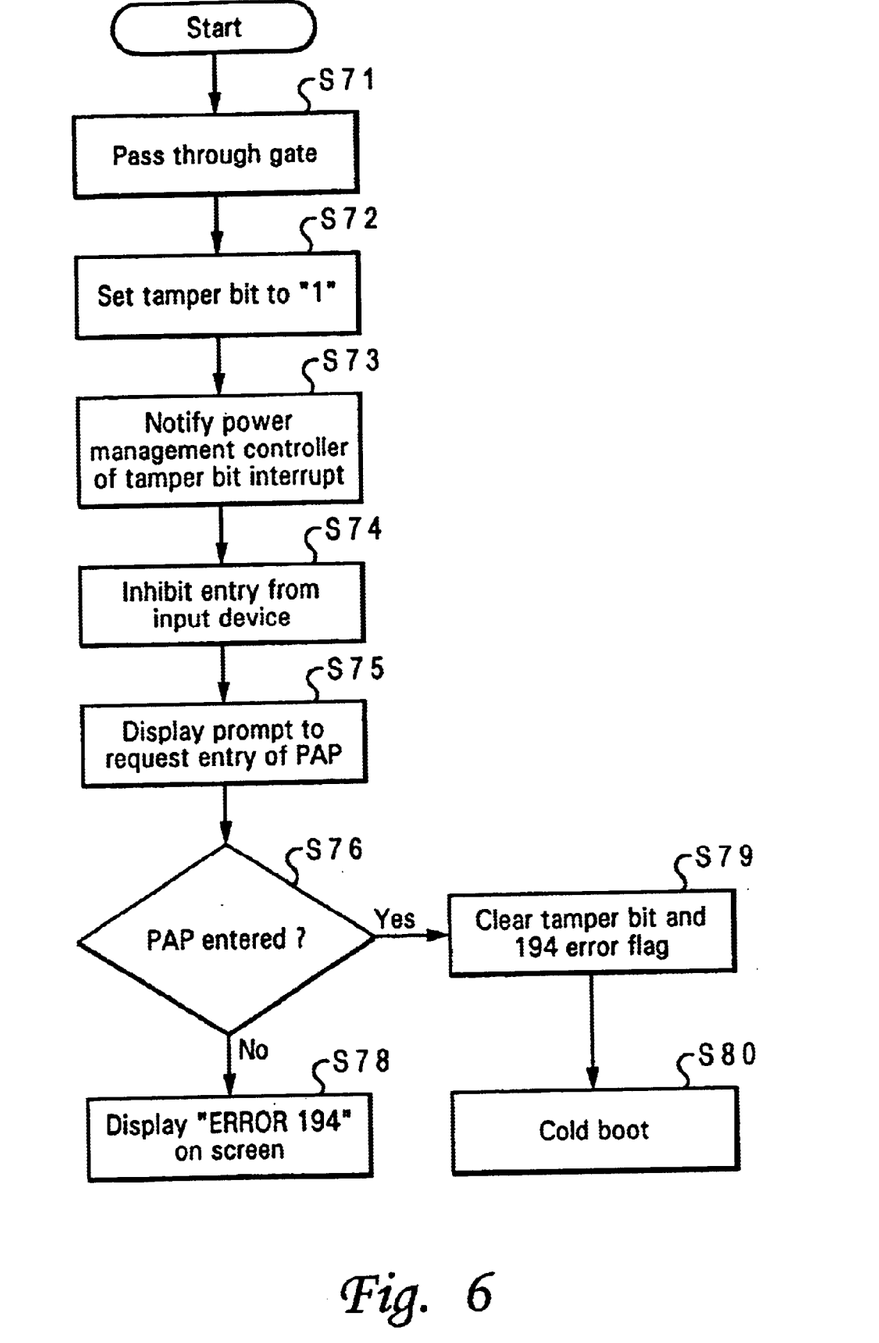
FIG. 6 is a flowchart showing the processing performed when an RFID data processing system is in the power-ON state, the standby state or the suspend state before it enters or exits from an unauthorized data access protection area and is not automatically powered off.

At step S76, a check is performed to determine whether the PAP has been entered. If the decision is No, program control moves to step S78, while if the decision is Yes, program control goes to step S79. At step S78, an "194 error" ("ERROR 194") message is continuously displayed on the screen of the input/output device 37. The user can not thereafter use the pertinent RFID data processing system 30. At step S79, the tamper bit 44 and the 194 error flag are cleared, and program control advances to step S80, where a cold boot of the system is performed.

Figure 7:
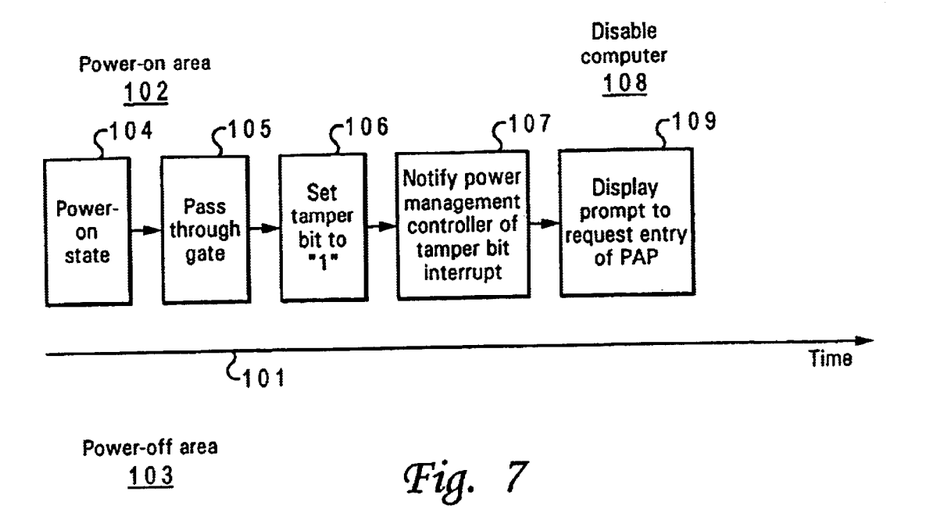
FIG. 7 is a diagram showing the state transition when an RFID data processing system is in the power-ON state, the standby state or the suspend state before it enters or exits from an unauthorized data access protection area and is not automatically powered off.

The above operation will be explained by using a visual aid reflecting another viewpoint, while referring to FIG. 7, in which the state transition of the RFID data processing system 30 is shown. In FIG. 7, the area above a time axis 101 represents a power-ON area 102, and the area below the time axis 101 represents a power-OFF area 103. In the beginning, the RFID data processing system 30 is in the power-ON state (state 104). The RFID data processing system 30 in the power-ON state (state 104) passes through the portal gate (state 105). At this time, the portal gate transmits a command to set to "1" the tamper bit 44 in the EEPROM 34 incorporated in the RFID data processing system 30. Upon receiving this command, the RFID data processing system 30 sets to "1" the tamper bit 44 in the EEPROM 34 (state 106).

When the tamper bit 44 has been set to "1," a "TAMPER INTR" signal 45 is output to the power management controller 40 by the EEPROM 34 (state 107). Then, data entry at the input/output device 37, such as at a keyboard or a mouse, is temporarily inhibited, and a prompt is displayed requesting the entry of a PAP (state 109). Thereafter, the processing can proceed in one of two directions, depending whether the PAP has been entered. When the PAP has not been input, an "194 error" ("ERROR 194") message is continuously displayed on the screen of the input/output device 37 and the user can not thereafter use the RFID data processing system 30. When the PAP has been entered, a cold boot is performed.

As is described above, according to this embodiment, when an RFID data processing system in the power-ON state or as in the standby state is passed through the portal gate without a predetermined password (e.g., a PAP or a supervisor password) being entered, the pertinent RFID data processing system is requested to enter a predetermined password. When the predetermined password is not entered, the use of the RFID data processing system is prohibited, so that data processing systems connected to the LAN in the unauthorized data access protection area can be protected from unauthorized access.

In the above embodiment, a method has been explained whereby, when an RFID data processing system 30 for which access authority has not been granted enters an unauthorized data access protection area, information present in this area is protected from being accessed by the pertinent RFID data processing system 30. However, the present invention is not limited to this method, and can be applied for a method whereby when an RFID data processing system 30 exits from an unauthorized data access protection area while access authority has not been granted for the pertinent data processing system, information present inside the unauthorized data access protection area is protected from being carried outside without proper authorization.

The reasons for the adoption of this functionality are as follows. A portal gate located at the entrance to an unauthorized data access protection area transmits, to an RFID data processing system 30 that passes through the gate, regardless of the direction in which the RFID data processing system 30 passes through, a signal to set to "1" the tamper bit 44 in the EEPROM 34. That is, a portal gate transmits a signal to set the tamper bit 44 to "1" both to an RFID data processing system 30 that enters an unauthorized data access protection area and to an RFID data processing system 30 that exits from the area.

In the above embodiment, a notebook data processing system (PC) is used as the RFID data processing system. However, the present invention is not limited in its use to such a data processing system, and can be used for other types of data processing systems, such as a PDA. Further, instead of the EEPROM 34 it is possible to use a semiconductor nonvolatile memory, such as an FRAM (Ferroelectric RAM) or a flash memory, or a semiconductor memory, such as a DRAM (Dynamic RAM) or an SRAM (Static RAM) supported by a secondary battery.

Furthermore, the present invention can be applied not only for an RFID data processing system, but can also be used with another device or with a network for RFID communication. In addition, the present invention can be applied not only for RFID communication, but also for a communication method that uses a radio wave frequency other than that normally used for RF (Radio Frequency), or for a communication method that uses a medium other than radio waves.

The present invention provides a method for prohibiting unauthorized data access in a wireless data carrier system. One part representative of the scope of the present invention will now be described. IC (Integrated Circuit) cards fabricated by incorporating IC devices in plastic cards are today used for a variety of purposes. These IC cards, although they have a number of applications, can be roughly divided into contacting IC cards and wireless IC cards. On the surface of a contacting IC card, a terminal is provided, and to exchange data with an external device, the IC card must be inserted into a dedicated receptacle so that the terminal on its surface can be brought into contact with a terminal on the external device. For a wireless IC card, however, instead of a terminal on the surface of the card, an antenna is provided internally, and to exchange data with an external device, radio waves are propagated between the antenna of the wireless IC card and an antenna at the external device. The present invention can be applied, therefore, for a wireless IC card, which is also called an RFID card.

Since the RFID technique is a technique by which radio waves are used for the exchange of data by wireless IC cards and external devices, its application is not limited to wireless IC cards. The RFID technique of the present invention can be applied, for example, for data carrier tags that can be attached to various products, thereby enabling the efficient management of product input/output records en route to and at distribution points.

Further, since the RFID technique can be applied for a personal data assistant (PDA) or for a notebook data processing system (PC), communication control for an RFID PDA or an RFID notebook PC can be provided at a specific facility whether the person who owns the device enters or exits from the location. As a result, unauthorized access to a data processing system system installed in a specific area can be prohibited. This process is performed as is described in the above embodiment.

The present invention has been described in association with the RFID technique. However, the present invention can be applied for a communication process that uses a frequency other than RF, or for a communication process that uses a medium other than a radio frequency. For example, some wireless IC cards use, as a communication medium, a microwave of 2.5 GHz or 5 GHz, or a magnetic wave. Data to be exchanged includes not only ID (Identification) information, but also various other information, such as industrial measurement data and medical diagnosis data.

As is described above, the present invention can be used for a variety of fields. Programming for the method of this embodiment for prohibiting unauthorized access in a wireless data carrier system can be performed using various programming languages. The program for prohibiting unauthorized access is recorded on a data processing system-readable recording medium. The recording medium can be a storage device mounted in a data processing system system, such as a ROM (Read Only Memory), a EEPROM (Electrically Erasable Programmable Read Only Memory), or a flash EEPROM; a portable recording medium, such as a floppy disk (FD), a CD-ROM (read only memory using a compact disk), or an MO (magneto-optical) disk; or a file device provided for a server data processing system connected to a network.

The program to prohibit unauthorized access, stored on the recording medium, is loaded into the data processing system in the following manner. When the recording medium is a storage device mounted in the data processing system, two different loading methods are used. Thus, when the recording medium is a read-only storage device, such as a ROM, a power management program is burnt in during the semiconductor fabrication process and the ROM is then mounted in the data processing system (for example, the ROM 39 in FIG. 1 corresponds to this case).

And when the recording medium is a read only memory, such as a EEPROM or a flash EEPROM, that is electrically writeable (hereinafter referred to as a "PROM"), the following process is performed. A conventional program for prohibiting unauthorized access is stored in the PROM and the PROM is mounted in the wireless data carrier. Then, the updating of the conventional program stored in the PROM to the program of the above embodiment is performed in the following manner. An FD, for example, recording the program for prohibiting unauthorized access is loaded into a floppy disk drive (FDD) that is connected to the I/O controller 36 of the RFID data processing system 30 in FIG. 1, and the program is read and is used to overwrite the PROM. The same process is performed with a portable recording medium such as a CD-ROM or an MO disk recording a program for prohibiting unauthorized access.

When the recording medium is a file source device on a network, the I/O controller 36 of the RFID data processing system 30 in FIG. 1 is connected to a network linking device, and via the network downloads from the file source device the program in this embodiment for prohibiting unauthorized access. Thereafter, the downloaded program is written to the PROM. The same writing method as is described above is used.

The operating system uses the program thus provided for the wireless data carrier, and executes the method for prohibiting unauthorized data access in a wireless data carrier system. According to the present invention, with the method for prohibiting unauthorized data access in a wireless data carrier system, a wireless data carrier in the power-ON state that enters or exits from an unauthorized data access protection area and that has no access authorization is disabled by the using of an interrupt. As a result, unauthorized data access can be prohibited without any deterioration of the system performance being incurred.

According to the present invention, with the method for prohibiting unauthorized data access in a wireless data carrier system, a wireless data carrier in the power-ON state that enters or exits from an unauthorized data access protection area and that has no access authorization is automatically powered off by using an interrupt. As a result, unauthorized data access can be prohibited without any deterioration of the system performance being incurred.

According to the present invention, with the method for prohibiting unauthorized data access in a wireless data carrier system, a wireless data carrier in the power-ON state that enters or exits from an unauthorized data access protection area and that has no access authorization is requested to obtain access authorization. As a result, unauthorized data access can be prohibited without any deterioration of the system performance being incurred.

It is important to note that while the present invention has been described in the context of a fully functional data processing system and/or network, those skilled in the art will appreciate that the mechanism of the present invention is capable of being distributed in the form of a data processing system usable medium of instructions in a variety of forms, and that the present invention applies equally regardless of the particular type of signal bearing medium used to actually carry out the distribution. Examples of data processing system usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for prohibiting unauthorized access to a data processing system, comprising:

using a wireless data carrier to communicate with a data processing system that includes a CPU, a semiconductor memory, a communication device and a power controller;

transmitting a signal on the wireless data carrier to the data processing system, in a power-ON state, to set a predetermined bit in the semiconductor memory whenever the data processing system enters or exits from an unauthorized data access protection area; and transmitting, with a portal gate, provided at the entrance to the unauthorized data access protection area, the wireless data carrier the signal for setting the predetermined bit in the semiconductor memory.

2. The method according to claim 1, wherein the predetermined bit in the semiconductor memory is a tamper bit, and wherein access authorization is granted to the data processing system in accordance with an entry of a predetermined password.

3. A method for prohibiting unauthorized access to a data processing system having a CPU, a semiconductor memory, a wireless communication device and a power controller on a data processing system network, said method comprising:

using a wireless data carrier to communicate with a data processing system that includes a CPU, a semiconductor memory, a communication device and a power controller;

transmitting a signal on the wireless data carrier to the data processing system, in a power-ON state, to set a predetermined bit in the semiconductor memory whenever the data processing system enters or exits from an unauthorized data access protection area;

transmitting, with a portal gate, provided at the entrance to the unauthorized data access protection area, the wireless data carrier the signal for setting the predetermined bit in the semiconductor memory;

a wireless communication device on the data processing system receiving the signal while the power controller is in a power-ON state;

responsive to the signal, determining if the signal instructs the data processing system to set a predetermined bit in a semiconductor memory;

setting the predetermined bit in the semiconductor memory as instructed by the signal;

issuing a tamper interrupt request from the semiconductor memory to the power controller; and in response to the tamper interrupt request, the power controller switching to a power-OFF state in which the power controller discontinues the supply of power to the data processing system.

4. The method of claim 3, wherein said receiving step comprises the wireless communication device receiving the signal when the data processing system crosses a boundary of an unauthorized data access protection area.

5. The method of claim 4, wherein the step of receiving the signal further comprises receiving the signal over-the-air when the data processing system crosses the boundary of an unauthorized data access protection area defined by a portal gate, which transits the signal.

6. The method of claim 3, wherein said method further comprises granting login access to said data processing system after said predetermined bit is set only in response to an entry of a predetermined password.

7. The method of claim 3, wherein the receiving step further comprises receiving a radio frequency electromagnetic signal.

8. The method of claim 3, further comprising, the wireless communication device continuing operation in the a power-on state, even when the power controller is in the power-OFF state, by means of an independent power source.

9. The method of claim 3, wherein the receiving step further comprises a microwave electromagnetic signal.

10. A data processing system comprising:
a semiconductor memory,
a wireless communication device for receiving a signal over-the-air;
means for using a wireless data carrier to communicate with a data processing system that includes a CPU, a semiconductor memory, a communication device and a power controller;
means for transmitting a signal on the wireless data carrier to the data processing system, in a power-ON state, to set a predetermined bit in the semiconductor memory whenever the data processing system enters or exits from an unauthorized data access protection area;
means for transmitting, with a portal gate, provided at the entrance to the unauthorized data access protection area the wireless data carrier the signal for setting the predetermined bit in the semiconductor memory;
means for processing signals, including:
means responsive to the signal, for determining if the signal instructs the data processing system to set a predetermined bit in a semiconductor memory;
means for setting the predetermined bit in the semiconductor memory as instructed by the signal;
wherein the semiconductor memory for issues a tamper interrupt request in response to setting of the predetermined bit; and
a power controller that, responsive to the tamper interrupt request, switches from a power-ON state to a power-OFF state in which the power controller discontinues the supply of power to the data processing system.

11. The system of claim 10, wherein the wireless communication device further comprises means for receiving the signal when the data processing system crosses a boundary of an unauthorized data access protection area.

12. The system of claim 11, wherein the wireless communication device further comprises means for receiving the signal over-the-air when the data processing system crosses the boundary of an unauthorized data access protection area defined by a portal gate, which transmits the signal.

13. The system of claim 10, wherein said system further comprises means for granting login access to said data processing system after said predetermined bit is set only in response to an entry of a predetermined password.

14. The system of claim 10, the wireless communication device further comprises means for receiving a radio frequency electromagnetic signal.

15. The system of claim 10, further comprising, means for the wireless communication device continuing operation in a power-on state, even when the power controller is in the power-OFF state, by means of an independent power source.

16. The system of claim 10, wherein the wireless communication device further comprises means for receiving a microwave electromagnetic signal.

17. A computer program product in a computer-readable medium for prohibiting unauthorized access to a data processing system having a CPU, a semiconductor memory, a wireless communication device and a power controller on a data processing system network, said computer program product comprising:
a computer-readable medium;
instructions on the computer-readable medium for using a wireless data carrier to communicate with a data processing system that includes a CPU, a semiconductor memory, a communication device and a power controller;
instructions on the computer-readable medium for transmitting a signal on the wireless data carrier to the data processing system in a power-ON state, to set a predetermined bit in the semiconductor memory whenever the data processing system enters or exits from an unauthorized data access protection area;
instructions on the computer-readable medium for transmitting with a portal gate provided at the entrance to the unauthorized data access protection area the wireless data carrier the signal for setting the predetermined bit in the semiconductor memory;
instructions on the computer-readable medium for receiving the signal on the data processing system, while the power controller is in a power-ON state;
instructions on the computer-readable medium for, responsive to the signal, determining if the signal instructs the data processing system to set a predetermined bit in a semiconductor memory;
instructions on the computer-readable medium for setting the predetermined bit in the semiconductor memory as instructed by the signal; and
instructions on the computer-readable medium for issuing a tamper interrupt request from the semiconductor memory to the power controller to cause the power controller to switch from a power-ON state to a power-OFF state in which the power controller discontinues the supply of power to the data processing system.

18. The computer program product of claim 17, wherein said receiving instructions further comprise instructions for receiving the signal when the data processing system crosses a boundary of an unauthorized data access protection area.

19. The computer program product of claim 18, wherein the instructions for receiving the signal further comprise instructions for receiving the signal over-the-air when the data processing system crosses the boundary of an unauthorized data access protection area defined by a portal gate which transmits the signal.

20. The computer program product of claim 17, wherein said computer program product further comprises instructions for granting login access to said data processing system after said predetermined bit is set only in response to an entry of a predetermined password.

21. The computer program product of claim 17, wherein the instructions for receiving flyer comprise instructions for receiving a radio frequency electromagnetic signal.

22. The computer program product of claim 17, further comprising, instructions for continuing operation in a power-on state, even when the power controller is in the power-OFF state, by means of an independent power source.

23. The computer program product of claim 17, wherein the instructions for receiving further comprise instructions for receiving a microwave electromagnetic signal.

* * * * *